(12) United States Patent
Baumgardt et al.

(10) Patent No.: US 11,063,308 B2
(45) Date of Patent: Jul. 13, 2021

(54) BATTERY FOR AN ELECTRIC VEHICLE

(71) Applicant: MOLABO GMBH, Ottobrunn (DE)

(72) Inventors: Andreas Baumgardt, Markt Schwaben (DE); Adrian Patzak, Aying (DE); Florian Bachheibl, Munich (DE)

(73) Assignee: MOLABO GMBH, Ottobrunn (DE)

( * ) Notice: Subject to any disclaimer, the term of this patent is extended or adjusted under 35 U.S.C. 154(b) by 105 days.

(21) Appl. No.: 16/609,755

(22) PCT Filed: May 2, 2018

(86) PCT No.: PCT/EP2018/061192
§ 371 (c)(1),
(2) Date: Oct. 31, 2019

(87) PCT Pub. No.: WO2018/206365
PCT Pub. Date: Nov. 15, 2018

(65) Prior Publication Data
US 2020/0067042 A1 Feb. 27, 2020

(30) Foreign Application Priority Data
May 8, 2017 (EP) ..................................... 17169964

(51) Int. Cl.
*H01M 4/02* (2006.01)
*H01M 10/42* (2006.01)
(Continued)

(52) U.S. Cl.
CPC ........... *H01M 10/425* (2013.01); *B60L 50/60* (2019.02); *B60L 50/64* (2019.02); *H01M 10/637* (2015.04); *H01M 50/20* (2021.01);

*H01M 50/581* (2021.01); *B60L 2200/10* (2013.01); *B60L 2200/32* (2013.01); *B60L 2210/10* (2013.01);
(Continued)

(58) Field of Classification Search
CPC ....................................................... H01M 4/02
See application file for complete search history.

(56) References Cited

U.S. PATENT DOCUMENTS 6,710,995 B2 3/2004 Knoedgen
7,671,565 B2 3/2010 Straubel et al.
(Continued)

FOREIGN PATENT DOCUMENTS

WO 2015177989 A1 11/2015

*Primary Examiner* — Jacob B Marks
(74) *Attorney, Agent, or Firm* — Greenberg Traurig, LLP

(57) ABSTRACT

A battery (10) for an electric vehicle comprises a plurality of battery cells (11), where a first group (12) comprises a plurality of battery cells (11) connected to each other in parallel, a second group (13) comprises a plurality of battery cells (11) connected to each other in parallel, and the first group (12) and the second group (13) are connected with each other in series forming a first line (14) of battery cells (11). The battery (10) further comprises a first terminal (16) which is configured to be connected with an electric machine (30) and with a power net (31) of the electric vehicle, and a second terminal (17) which is configured to be connected with a reference potential (32). The battery (10) is configured to supply the electric machine (30) and the power net (31) of the electric vehicle with power, and the electric machine (30) and the power net (31) are supplied with the same voltage level by the battery (10).

18 Claims, 9 Drawing Sheets

Figure 1:
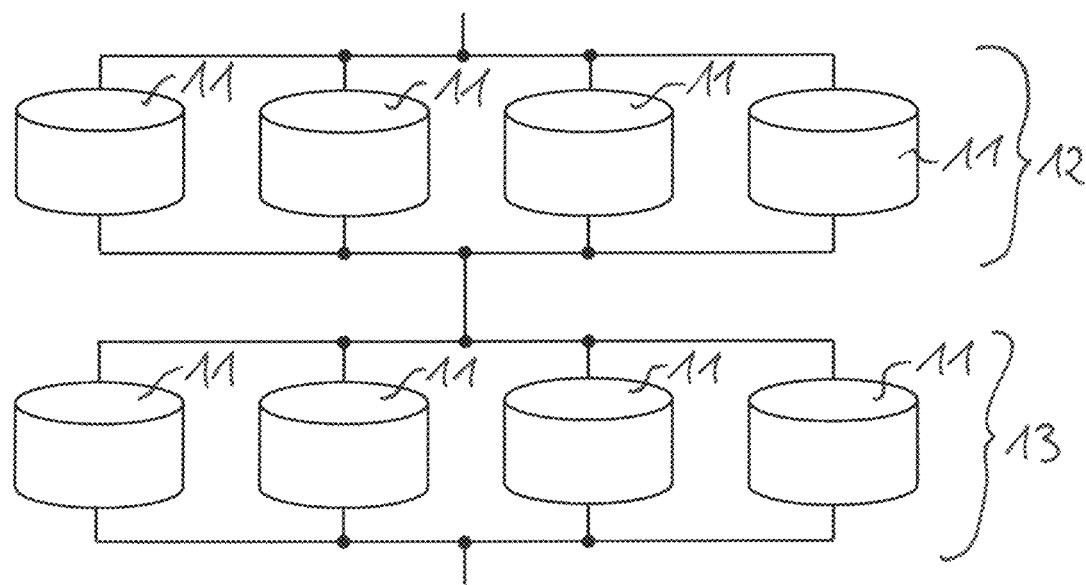

(51) Int. Cl.
*H01M 10/637* (2014.01)
*B60L 50/64* (2019.01)
*B60L 50/60* (2019.01)
*H01M 50/20* (2021.01)
*H01M 50/581* (2021.01)

(52) U.S. Cl.
CPC ..... *B60Y 2200/91* (2013.01); *B60Y 2400/112* (2013.01); *H01M 2010/4271* (2013.01); *H01M 2200/103* (2013.01); *H01M 2200/106* (2013.01); *H01M 2220/20* (2013.01)

(56) References Cited

U.S. PATENT DOCUMENTS

| | | | |
|---|---|---|---|
| 2005/0212495 A1* | 9/2005 | Leyten | H01M 10/0445 323/211 |
| 2015/0044520 A1 | 2/2015 | Feuerstack et al. | |

* cited by examiner

BATTERY FOR AN ELECTRIC VEHICLE

CROSS-REFERENCE TO RELATED APPLICATIONS

This application is a U.S. National Phase Application of PCT International Application No. PCT/EP2018/061192, filed May 2, 2018, entitled "BATTERY FOR AN ELECTRIC VEHICLE", which claims the benefit of and priority to European Application No. 17169964.8, filed May 8, 2017, all of which is hereby incorporated by reference for all purposes.

The present application relates to a battery for an electric vehicle.

Electric vehicles with an electric machine or an electric motor require a battery with a large capacity in order to enable traveling over large distances. In order to achieve a large capacity of the battery it is common to connect a plurality of battery cells with a small capacity, as for example lithium ion batteries. When connecting the plurality of battery cells in series the battery voltage can amount to several hundreds of volts. For these high voltages a special isolation of the battery and other safety precautions are required.

It is an objective to provide a battery for an electric vehicle which requires less isolation and safety precautions.

This objective is solved by the independent claim. Further embodiments are subject of dependent claims.

In one embodiment of the battery for an electric vehicle the battery comprises a plurality of battery cells. A first group comprises a plurality of battery cells connected to each other in parallel and a second group comprises a plurality of battery cells connected to each other in parallel. The first group and the second group are connected with each other in series forming a first line of battery cells.

The battery cells can be for example lithium ion batteries with rated cell voltages between 3 and 4 V. The battery cells each comprise electrical contacts via which they can be electrically contacted. This means, in the first group and in the second group the battery cells are connected in parallel in an electrical circuit, respectively. The first group and the second group are connected in series in an electrical circuit.

The term "line" refers to a plurality of battery cells electrically connected to each other. Each line comprises at least a first group and a second group that are connected with each other in series. Alternative expressions for "line" are line section, chain, string or strand.

The electric vehicle can be any craft that can move on ground, in the air or on water. For example, the electric vehicle can be a car, an airplane or a boat.

It is possible that further groups of battery cells are connected in series with the first group and the second group. Also the further groups comprise a plurality of battery cells connected to each other in parallel.

It is possible that one or more second lines of battery cells are connected in parallel to each other and to the first line. Also the second line of battery cells comprises a plurality of battery cells. In each line at least a first and a second group are connected with each other in series.

The battery further comprises a first terminal which is configured to be connected with an electric machine and to a power net of the electric vehicle. The first terminal can be an electrical contact where the battery can be electrically contacted and where a load can be connected. The electric machine can be the electric machine of the electric vehicle. The power net of the electric vehicle is configured to supply other devices in the electric vehicle than the electric machine with power. The other devices in the electric vehicle can be for example the radio, loudspeakers, a navigation system, lights or windscreen wipers.

This means, the battery is electrically connected with the electric machine of the electric vehicle and with the power net of the electric vehicle. Consequently, only one battery is required for the electric vehicle.

The electric machine of the electric vehicle can be for example an electric motor. The movement of the electric vehicle can be driven by the electric machine and the electric machine is the main engine for traction of the electric vehicle. It is also possible that the electric machine comprises several electric machines or several electric motors. For example, the electric machine can comprise an electric machine for a front axle and a back axle of an electric vehicle, respectively. Furthermore, it is possible that the electric machine comprises four electric machines or four electric motors.

The battery further comprises a second terminal which is configured to be connected to a reference potential. The second terminal can be an electrical contact where the battery can be electrically contacted and where a load can be connected. The battery voltage is given relative to the reference potential. Moreover, the battery voltage can be tapped between the first terminal and the second terminal and it is a DC (direct current) voltage.

The battery is configured to supply the electric machine and the power net of the electric vehicle with power, and the electric machine and the power net are supplied with the same voltage level by the battery. This means, the electric machine and the power net are operated at the same voltage level. The same voltage level in this case means that it is approximately the same voltage level. However, the exact voltage level at the electrical contacts of the electric machine and the power net can slightly differ from the battery voltage because of losses in the electrical circuit where the electric machine, the power net and the battery are connected with each other. The voltage level at the electrical contacts of the electric machine and the power net can also slightly differ from the battery voltage because of losses at switches or other components of the electrical circuit.

It is also possible that the power net comprises a sub power net which is operated at a voltage which is different from the battery voltage. For example at least a part of the power net can be operated at a voltage which is lower than the battery voltage. The sub power net can for example be operated at 12 V.

The battery cells are arranged in such a way that a small battery voltage is enabled. A small battery voltage can be for example a voltage which is equal to or smaller than 60 V.

The number of battery cells connected with each other in the first group and in the second group, respectively, are chosen in such a way that the capacity of the battery is as high as required for an electric vehicle. At the same time, the number of groups connected to each other in series is kept small enough such that the battery voltage does not exceed a desired value.

Therefore, the battery is configured in such a way that the battery voltage is small. This means, the battery voltage can be for example below a set maximum value.

The net capacity of the battery which can be used to power for example the electric machine is larger if the battery comprises only one line of battery cells. In that case the battery comprises the first line and no second line or further lines. If several groups of battery cells are arranged in series the maximum capacity that can be used from this line of battery cells is equal to the capacity of the group with the smallest capacity. If a plurality of battery cells is arranged in parallel the maximum capacity that can be used from this group of battery cells is the sum of the capacities of the battery cells. Due to for example aging, temperature differences or the manufacturing process the capacities of the battery cells can slightly differ. Furthermore, it is possible that single battery cells are defective. Defective battery cells therefore have less influence on the net capacity if the battery comprises only one line of battery cells. The difference in net capacity between a battery with only one line and a battery with at least two lines can for example amount to 2%.

In a battery with only one line of battery cells the currents flowing in the battery are higher in comparison to a battery with a higher battery voltage. Thus, the switches, fuses and other parts of the battery are required to withstand these high currents.

In a battery with at least one first and at least one second line arranged in parallel the currents flowing in the first or second lines, referred to as line currents, are smaller than the currents in a battery comprising only one line. Thus, conventional switches, fuses and other parts of the battery can be employed.

Advantageously, less isolation and less safety precautions are required for small battery voltages. Furthermore, the electric machine and the power net are both supplied with power by the battery. No converters are required to convert the battery voltage for the power net which is usually operated at small voltages.

In one embodiment of the battery, at least one second line of battery cells is connected in parallel with the first line, where the second line comprises the same features as the first line. The second line comprises at least one first group and at least one second group of battery cells. The first line and the at least one second line are connected with each other in parallel in an electrical circuit. Preferably, more than one second line are connected in parallel with the first line.

By connecting the first line and at least one second line in parallel to each other the capacity of the battery is increased. Consequently, the number of groups connected in series to each other in each line can be kept small enough such that the battery voltage does not exceed a desired value and at the same time the capacity of the battery is as high as required for an electric vehicle.

In one embodiment of the battery, the battery voltage which can be tapped between the first terminal and the second terminal of the battery is at most 60 V. Preferably, the battery voltage is at least 6 V. For this voltage range it is possible that the battery is operated at separated extra low voltage and that it is compliant with standards defining the separated extra low voltage.

In a preferred embodiment the rated battery voltage amounts to 48 V.

In one embodiment of the battery the electric machine to which the first terminal is configured to be connected to is the traction motor of the electric vehicle. This means, the movement of the electric vehicle is driven by the electric machine and the electric machine is the main motor for traction of the vehicle.

In one embodiment of the battery, the battery is configured to be the only power supply for the electric machine. This means, the electric machine is the only traction motor of the electric vehicle and the electric vehicle does not comprise another traction motor as for example a petrol engine.

In one embodiment of the battery the first line and the second line each comprise a main switch which is arranged in series with the first group and second group, respectively. This means, with the main switch the respective line can be activated or deactivated. All further lines also comprise a main switch which is arranged in series with the first group and the second group, respectively. By closing the main switch the respective line can be activated and by opening the main switch the respective line can be deactivated.

In one embodiment of the battery a resistor and a resistor switch, arranged in series, are arranged in parallel to each main switch. By employing the resistor and the resistor switch high currents in the battery during the switch on phase are avoided. In each line the line current can be different because of slight differences between the capacities of the battery cells. In order to avoid high compensation currents between different lines, before activating a line the resistor switch is closed. The compensation currents are reduced because of the resistor. The line currents are measured for each line and if the line currents are smaller than a set maximum current value the main switch is closed in order to activate the respective line. As the resistor switch is closed before a line is activated it is possible to avoid line currents that are larger than a set maximum current value.

In one embodiment of the battery the main switch is a semiconductor switch, as for example a transistor. In this case the main switch can be employed to equalize the line currents in the different lines of the battery. Due to slight differences between the battery cells the line currents can differ from each other. Consequently, the battery cells in a line with a higher line current are discharged more than battery cells in a line with a smaller line current. This means, the battery cells that are discharged more are degrading and aging faster than the other battery cells. Furthermore, it is possible that compensation currents arise if the power consumed by for example the electric machine or another load changes with time. By employing a semiconductor switch as the main switch each semiconductor switch can be controlled with a different gate voltage in such a way that the line currents in all lines of battery cells are equal.

In one embodiment of the battery, one or more further semiconductor switches are connected in parallel to each other and to the main switch. In this embodiment the further semiconductor switches are employed to equalize the line currents by activating the desired number of semiconductor switches which share the same gate voltage. This solution does advantageously not rely on variable gate voltages. Thus, it is not necessary to control the main switches but only the further semiconductor switches with different gate voltages.

In one embodiment of the battery, the first terminal and the second terminal of the battery are coplanar or coaxial. The first and the second terminal can for example be arranged at an outer surface of the battery. For example, the first and the second terminal can comprise the same or a similar shape. Advantageously, the first terminal and the second terminal are coplanar or coaxial in order to reduce the extent of the magnetic field induced by the current flowing through the terminals.

In one embodiment of the battery, the first terminal and/or the second terminal of the battery comprise at least two contacts, respectively. The at least two contacts of the first and/or the second terminal can be arranged next to each other or on top of each other. It is also possible that the at least two contacts of the first and/or the second terminal are arranged at different side surfaces of the battery. As the battery voltage is small, the currents at the first and the second terminal can be high. Therefore, it is advantageous to distribute the current over several electrical contacts.

In one embodiment of the battery, the first terminal and the second terminal of the battery are arranged coaxial. Also in this way the extent of the magnetic field induced by the current flowing through the terminals is reduced.

In one embodiment of the battery, the first terminal and/or the second terminal of the battery are arranged as plugs. In another embodiment of the battery, the first terminal and/or the second terminal of the battery are arranged as sockets.

In one embodiment of the battery, the battery comprises at least two battery modules. This means, the battery cells of the battery are distributed over the at least two battery modules. Every battery module comprises a plurality of battery cells. By distributing the battery cells to the different battery modules it is possible to arrange the different battery modules at different places in the electric vehicle. Therefore, all places in the vehicle where there is space for battery modules can be used.

Moreover, the battery modules can be configured to be exchanged separately from each other. This means, at least some of the battery modules can be removed from the electric vehicle and be replaced by for example charged battery modules. For example, battery modules that are arranged in easily accessible places of the electric vehicle as the trunk can be exchanged. In this way, a driver or a user of the electric vehicle does not have to wait until all battery modules are recharged before continuing to drive but the driver or the user can exchange some battery modules which takes less time than recharging all battery modules.

In one embodiment of the battery, each battery module comprises at least one first line. It is also possible that a battery module comprises at least one second line. This means the lines are not distributed over the battery modules but each line is arranged in only one battery module. If one or more battery modules can be exchanged it is also possible that a DC/DC converter for each line is arranged outside of the respective battery module.

In one embodiment of the battery, at least one first line is comprised by at least two battery modules. It is also possible that at least one second line is comprised by at least two battery modules. This means, the plurality of battery cells of the respective line is distributed over at least two battery modules. Some battery cells of the first or the second line are arranged in a first battery module and the other battery cells of the first or the second line are arranged in at least one second battery module. The at least two battery modules are electrically connected with each other in such a way that the groups of the respective line are connected with each other in series. If all lines of battery cells of the battery are comprised by at least two battery modules temperature differences between the battery modules and different contact resistances of different battery modules are experienced by all lines of battery cells in the same way. Therefore, differences in capacity or voltage of the lines of battery cells due to external parameters as the temperature or contact resistances of the battery modules are avoided.

In one embodiment of the battery, the at least two battery modules are configured to be electrically coupled to the electric machine of the electric vehicle. In this embodiment the electric machine is employed to equalize the line currents of the different lines of the battery. If an electric machine comprises different electrical phases each line is electrically connected to one or more electrical phases. By supplying the electrical phases with different DC currents the line currents can be regulated and equalized. As the electric machine is controlled by AC currents of the different electrical phases the regulation of the line currents can take place both when the electric machine is operated and when it is not operated since the line currents are regulated only by DC currents. Alternatively, it is possible to employ the electric machine partially in motor mode and partially in generator mode for regulating the line currents.

If single battery modules can be exchanged and be replaced by charged battery modules the charging level of the charged battery modules and the battery modules which are not replaced can be very different. This means, high compensation currents can arise. By regulating the line currents by coupling the battery modules to the electric machine the losses during regulation of the line currents are smaller in comparison to losses during a regulation of the line currents by passive elements as for example a positive temperature coefficient thermistor or a resistor with a resistor switch.

In one embodiment of the battery, the at least two battery modules are connected to each other in parallel and each battery module is assigned a respective switch to activate and/or deactivate the respective battery module. The switch can be for example a DC/DC converter, an electro mechanical switch, a semiconductor switch or an electrical switch. In this way, the battery modules can be arranged in different places of the electric vehicle and the risk of a local damage of the battery is reduced as a damaged battery module can be disconnected from the other battery modules by the respective switch.

In one embodiment of the battery, each first line comprises a positive temperature coefficient thermistor or a DC/DC converter, which is arranged in series with the first group and the second group, respectively. The positive temperature coefficient thermistor has a resistance which increases with temperature. As the temperature of a cable or a conductor increases with increasing current density, with the positive temperature coefficient thermistor line currents exceeding a set maximum current value can be avoided. It is further possible to equalize the line currents by employing a positive temperature coefficient thermistor. The lines with a higher line current heat up more than lines with a smaller line current. Thus, also the resistance of the positive temperature coefficient thermistor in lines with a higher line current is increased which leads to a reduction of the line current in the respective line of battery cells.

Similarly, with a DC/DC converter the line currents can be regulated. The voltage of each line can be regulated with the DC/DC converter and thus also the line current. Preferably, the DC/DC-converter has multiple windings and multiple input/output stages.

In one embodiment, the DC/DC-converter is connected with the first terminal and the second terminal of the battery and each line is connected individually to the DC/DC-converter. In addition, there is a galvanic connection between each line and the first terminal and the second terminal of the battery. In this configuration, it is possible to equalize the line currents within the battery without routing the complete battery power through the DC/DC-converter.

In an alternative embodiment, there are no galvanic connections between the lines and the first and the second terminal of the battery and the whole power is routed through the DC/DC-converter. In this case one of the DC/DC-converter's windings can be realized with a higher winding number than at least another winding and can be connected to a high-voltage tap. Thus, the DC/DC-converter can act as a battery charger.

In one embodiment of the battery, a fuse is connected to a circuit node of the first line and to a circuit node of the second line. In this way, the line currents can be regulated such that the line currents in all lines are the same. Furthermore, if for example a battery cell in the first line is defective a high line current can arise in the first line. With the fuse it is avoided that the high line current also flows through the second line and further lines.

In one embodiment of the battery, the fuse is a positive temperature coefficient thermistor. In the case of high line currents the resistance of the positive temperature coefficient thermistor increases such that the high line current cannot flow from the first line to the second line. If the line current decreases again the positive temperature coefficient thermistor cools down again and the resistance decreases.

In one embodiment of the battery, the electric vehicle is at least one of:
 a craft that can move on ground,
 a craft that can move in the air,
 a craft that can move on and/or in water.

It is possible that the electric vehicle can move only in certain places or in all of the places described above. The movement of the electric vehicle is at least partially driven by the electric machine.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

In FIG. 1 a first group and a second group of battery cells are shown.

Figure 2:
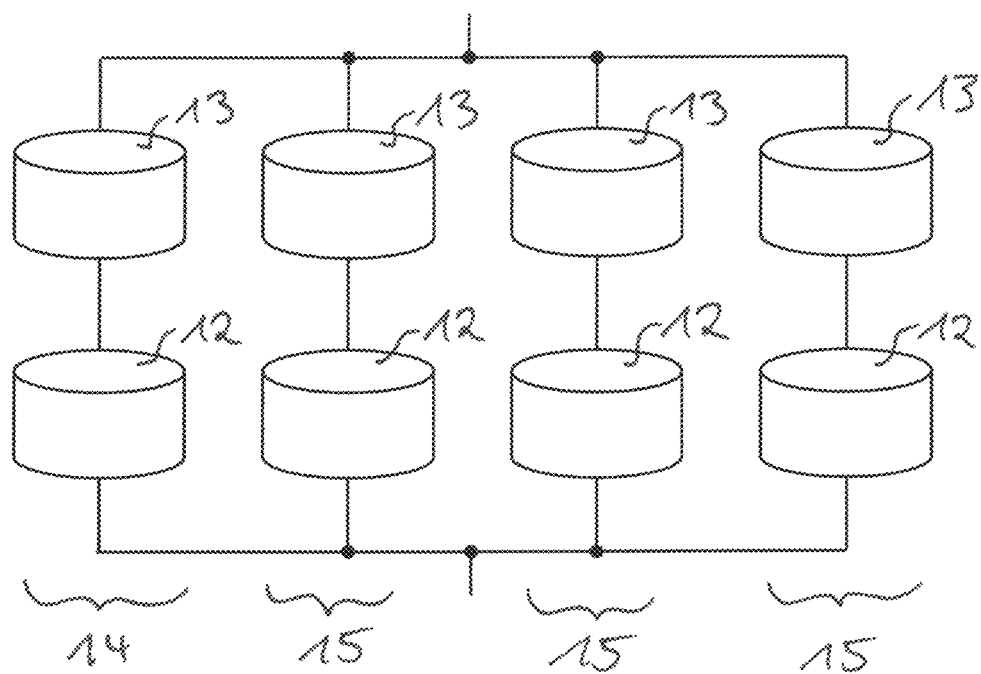
Figure 3A:
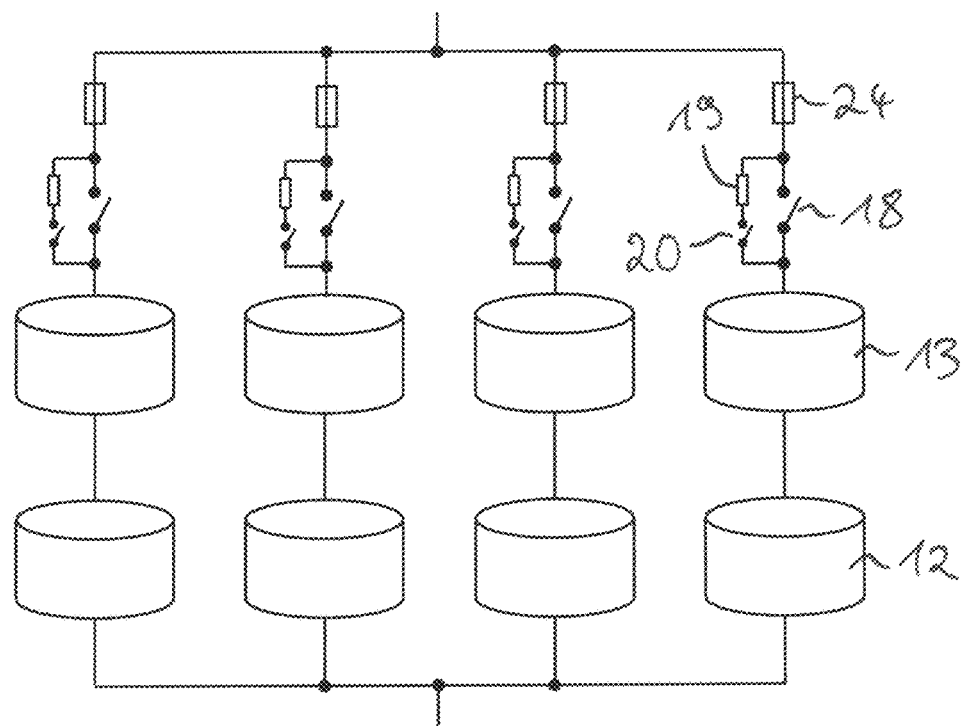
Figure 3B:
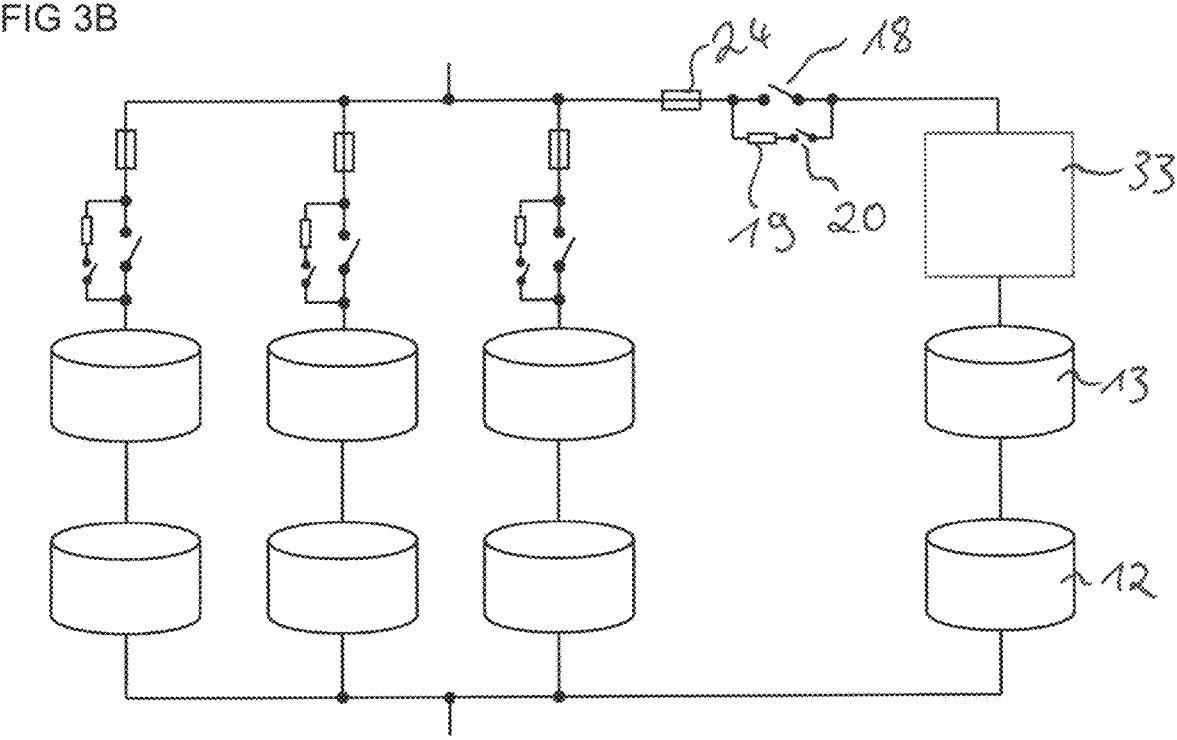

In FIGS. 2, 3A and 3B four lines arranged in parallel are shown.

Figure 4A:
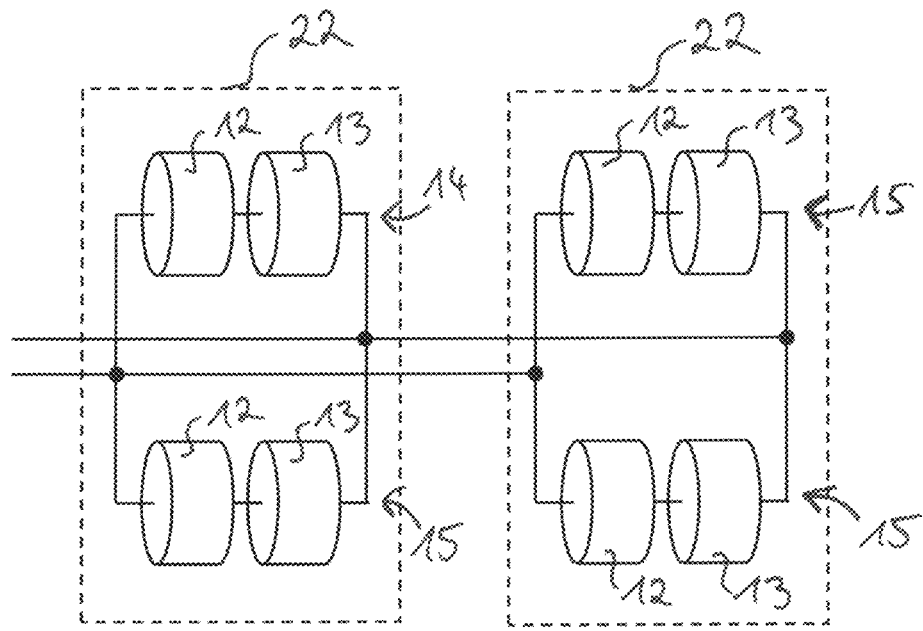
Figure 4B:
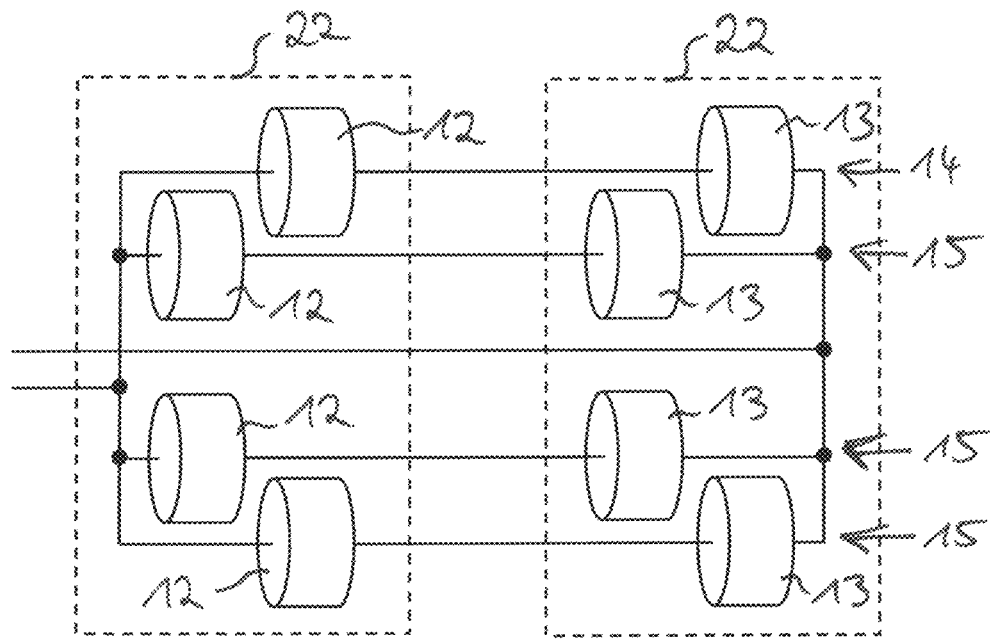

In FIGS. 4A and 4B two battery modules are depicted.

Figure 5:
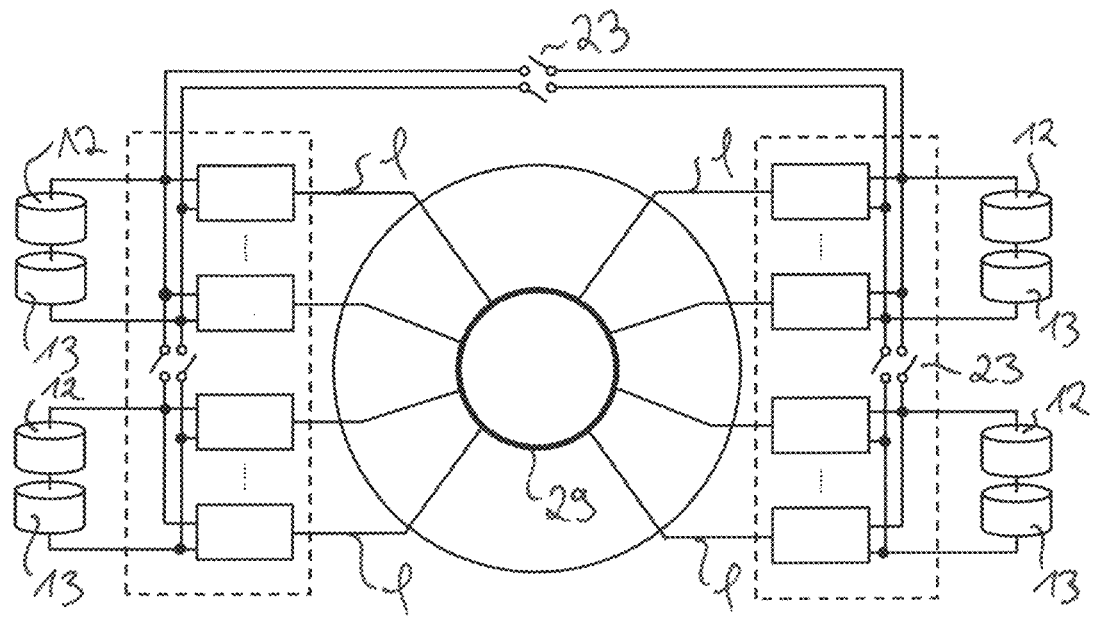

In FIG. 5 battery cells connected to the electric machine are shown.

Figure 6:
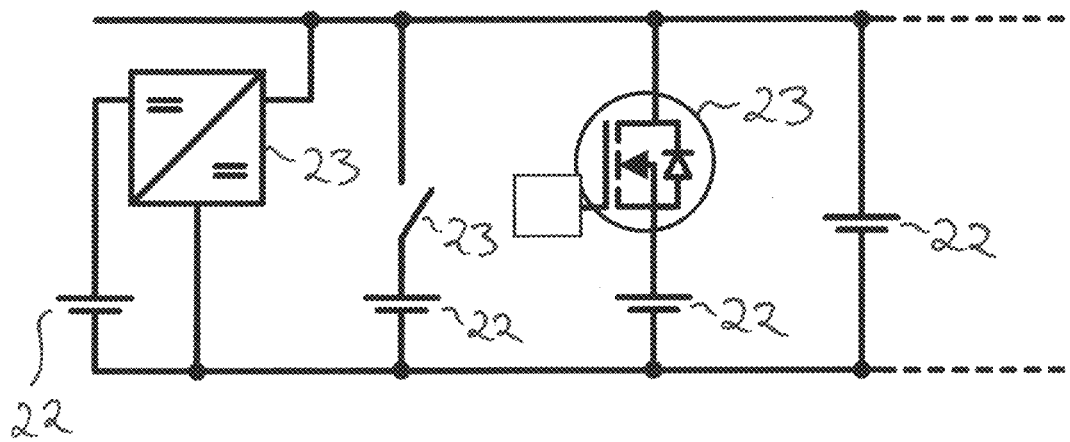

FIG. 6 shows an electrical circuit with battery modules connected in parallel to each other.

With FIGS. 7A, 7B, 8 and 9 fuses for battery cells are described.

In FIGS. 10A, 10B, 10C, 11A, 11B, 11C, 11D, 11E, 11F, 11G, 11H, 11I, 12A, 12B, 13A and 13B electrical contacts of the battery are shown.

Figure 14:
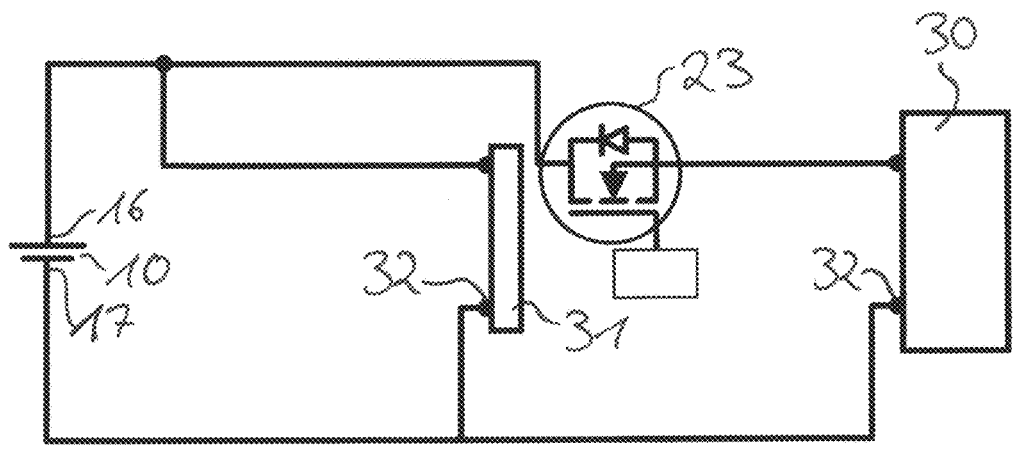

In FIG. 14 a circuit arrangement comprising the battery 10 is shown.

In FIG. 1 a plurality of battery cells 11 of a battery 10 for an electric vehicle is shown. A first group 12 comprises four battery cells 11 connected to each other in parallel. A second group 13 also comprises four battery cells 11 connected to each other in parallel. The first group 12 and the second group 13 are connected with each other in series forming a first line 14. It is possible that further groups comprising battery cells 11 are connected in series with the first group 12 and the second group 13. The battery cells 11 can be for example lithium ion batteries with rated battery voltages between 3 and 4 V.

The number of groups connected to each other in series can be kept small enough such that the battery voltage does not exceed a desired value and at the same time the capacity of the battery 10 is as high as required for an electric vehicle. The battery voltage can for example be at least 6 V and at most 60 V.

In FIG. 2 four lines arranged in parallel are shown. The first line 14 comprises a first group 12 and a second group 13 connected to each other in series. This means, the first group 12 is for example a first group 12 as depicted in FIG. 1. A second line 15 also comprises a first group 12 and a second group 13 connected to each other in series. The first line 14 is connected to the second line 15 in parallel. Two further second lines 15 comprising a first group 12 and a second group 13 are connected to the first line 14 and the second line 15 in parallel.

The number of groups 12, 13 connected in series to each other in each line can be kept small enough such that the battery voltage does not exceed a desired value and at the same time the capacity of the battery 10 is as high as required for an electric vehicle.

In FIG. 3A four lines which are connected in parallel are shown. Each line comprises a main switch 18 which is arranged in series with the first group 12 and the second group 13. Furthermore, a fuse 24 is arranged in series with the first group 12 and the second group 13 in each line. The fuse 24 can be a positive temperature coefficient thermistor or a DC/DC converter 33. A resistor 19 and a resistor switch 20 are connected to each other in series. Both the resistor 19 and the resistor switch 20 are arranged in parallel to each main switch 18. For each line a line current $I_1$ can be measured. In order to avoid high compensation currents between different lines, before activating a line the resistor switch 20 is closed. The compensation currents are reduced because of the resistor 19. The line current $I_1$ is measured for each line and if the line current $I_1$ is smaller than a set maximum current value the main switch 18 is closed in order to activate the respective line. As the resistor switch 20 is closed before a line is activated it is possible to avoid line currents $I_1$ that are larger than a set maximum current value.

In FIG. 3B four lines which are connected in parallel are shown. The setup of the lines is the same as shown in FIG. 3A. Additionally, in one second line 15 a DC/DC converter 33 is connected with the groups 12, 13 of battery cells 11 and the main switch 18 in series. With a DC/DC converter 33 the line currents $I_1$ can be regulated. The voltage of each line can be regulated with the DC/DC converter 33 and thus also the line current $I_1$. If the battery 10 comprises one or more battery modules 22 which can be exchanged it is also possible that a DC/DC converter 33 for each line is arranged outside of the respective battery module 22.

In FIG. 4A two battery modules 22 are shown. Each battery module 22 comprises two lines 14, 15 each comprising two groups 12, 13 of battery cells 11. The first line 14 and the second line 15 are connected with each other in parallel by an electric line which can be for example an electric cable. Moreover, the two battery modules 22 are connected with each other in parallel.

Electric lines or cables crossing each other in the figures are electrically isolated against each other. Electric lines or cables which are connected with a connection point in the figures are electrically connected with each other.

By distributing the groups 12, 13 of battery cells 11 to the different battery modules 22 it is possible to arrange the different battery modules 22 at different places in the electric vehicle. Therefore, all places in the vehicle where there is space for battery modules 22 can be used.

In FIG. 4B two battery modules 22 and four lines 14, 15 are shown. Each line 14, 15 is distributed over the two battery modules 22. This means, a first group 12 of for example the first line 14 is arranged in one battery module 22 and the second group 13 of the first line 14 is arranged in the other battery module 22. The groups 12, 13 of each line are connected in series with each other. The four lines 14, 15 are connected to each other in parallel.

If all lines of the battery 10 are comprised by at least two battery modules 22 temperature differences between the battery modules 22 and different contact resistances of different battery modules 22 are experienced by all lines in the same way. Therefore, differences in capacity or voltage of the lines due to external parameters as the temperature or contact resistances of the battery modules 22 are avoided.

In FIG. 5 groups 12, 13 of battery cells 11 connected to the electric machine 30 of the electric vehicle are shown. The groups 12, 13 can be comprised by different battery modules 22 which are not shown. The groups 12, 13 are arranged in four different lines where each line comprises a first group 12 and a second group 13. The electric machine 30 comprises different electrical phases φ. The electrical phases φ can each be supplied with a respective phase current. The phase currents comprise an AC and a DC component. Each line is connected to two or more electrical phases φ of the electric machine 30. The electrical phases φ are short-circuited on a short circuit ring 29 of the electric machine 30. Therefore, the line currents $I_1$ are equalized if the groups 12, 13 of battery cells 11 are connected with the electrical phases φ.

This means, the electric machine 30 is employed to equalize the line currents $I_1$. As the electric machine 30 is controlled by the AC components of the phase currents the regulation of the line currents $I_1$ can take place both when the electric machine 30 is operated and when it is not operated.

In order to exchange battery modules 22, switches 23 are arranged between the lines. If single battery modules 22 can be exchanged and be replaced by charged battery modules 22 the charging level of the charged battery modules 22 and the battery modules 22 which are not replaced can be very different. This means, high compensation currents can arise. By regulating the line currents $I_1$ by coupling the battery modules 22 to the electric machine 30 the losses during regulation of the line currents $I_1$ are smaller in comparison to losses during a regulation of the line currents $I_1$ by passive elements as for example a positive temperature coefficient thermistor or a resistor 19 with a resistor switch 20.

FIG. 6 shows an electrical circuit with four battery modules 22 connected to each other in parallel. Three of the battery modules 22 can be disconnected from the other battery modules 22 by a switch 23 which is connected in series with the respective battery module 22. This means, each of these battery modules 22 is assigned a respective switch 23 to activate and/or deactivate the respective battery module 22. The first switch 23 on the left-hand side of the electrical circuit is a DC/DC converter 33. The second switch 23 is a mechanical switch and the third switch 23 is a semiconductor switch. The fourth battery module 22 cannot be disconnected by a respective switch 23. It is also possible that further battery modules 22 are connected to the four battery modules 22 in parallel.

Figure 7A:
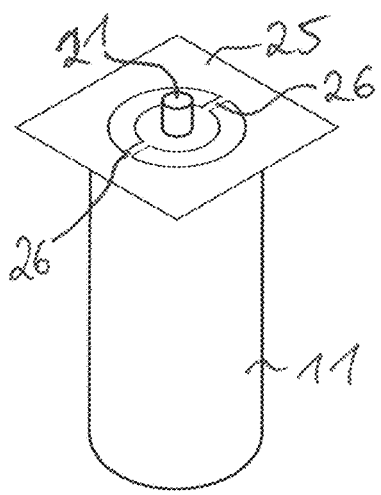

In FIG. 7A a battery cell 11 with an electrical contact 21 is shown. The electrical contact 21 is a contact comprising a screw. The electrical contact 21 of the battery cell 11 is connected to a metal sheet 25. The metal sheet 25 can comprise aluminum or copper and it can connect several battery cells 11 with each other in parallel. The metal sheet 25 comprises a circular shaped hole around the electrical contact 21 except for two connections 26. The connections 26 act as fuses 24. If the current flowing from the battery cell 11 towards the metal sheet 25 is too high the two connections 26 will warm up and melt. For a better stability against for example torque exerted on the electrical contact 21 the metal sheet 25 comprises two connections 26 instead of only one.

Figure 7B:
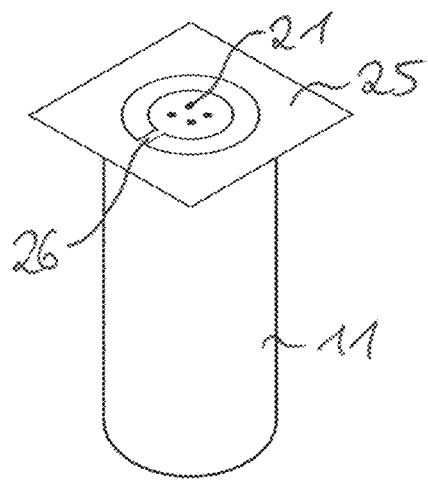

In FIG. 7B a battery cell 11 with an electrical contact 21 which is a welding contact is shown. In this case the metal sheet 25 only comprises one connection 26 as a fuse 24 since no torque is exerted on the electrical contact 21.

Figure 8:
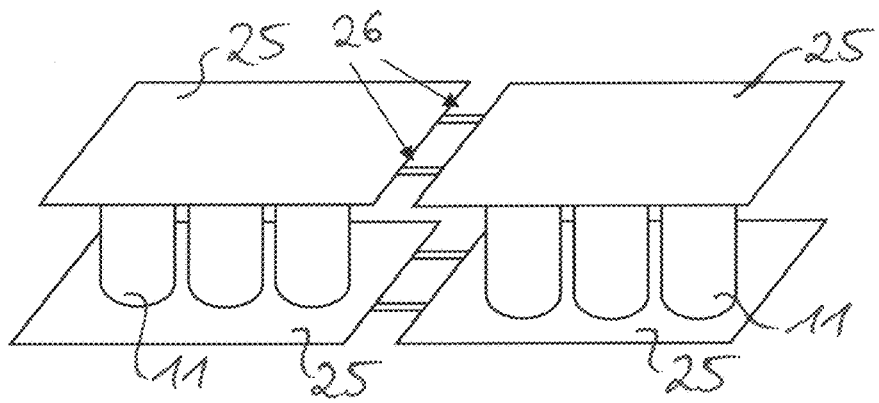

In FIG. 8 six battery cells 11 which are connected with metal sheets 25 are shown. Three battery cells 11 are connected with a metal sheet 25 on a top side of the battery cells 11 and with another metal sheet 25 on a bottom side of the battery cells 11 facing away from the top side. Three further battery cells 11 are also connected with a metal sheet 25 on the top side and with another metal sheet 25 on the bottom side of the battery cells 11. The two metal sheets 25 on the top side of the battery cells 11 are connected with each other by two thin connections 26. Similarly, the two metal sheets 25 on the bottom side of the battery cells 11 are connected with each other by two thin connections 26. The connections 26 act as fuses 24 as described with FIG. 7A.

Figure 9:
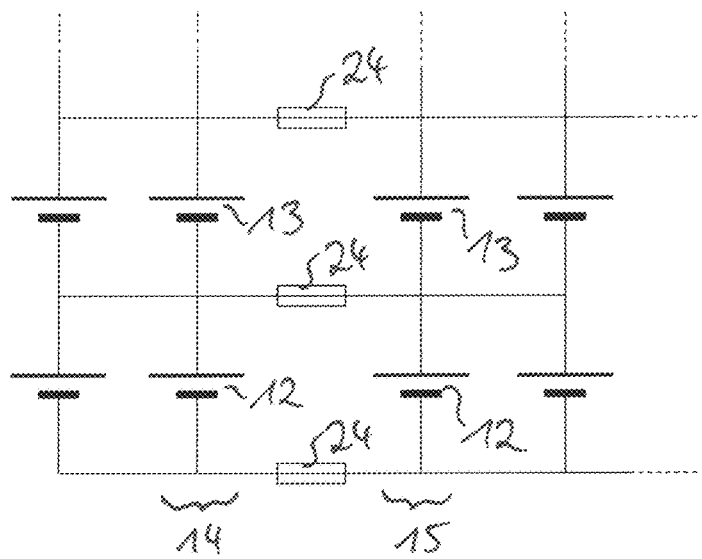

In FIG. 9 four lines are connected to each other in parallel. Each line comprises at least a first group 12 and a second group 13 of battery cells 11. A fuse 24 is connected to a circuit node of a first line 14 and to a circuit node of a second line 15. Two further fuses 24 are connected to further circuit nodes of the first line 14 and of the second line 15, respectively. In this way, the line currents $I_1$ in the different lines can be regulated such that all line currents $I_1$ are the same. Furthermore, if for example a battery cell 11 or a group 12, 13 of battery cells 11 in the first line 14 is defective a high line current $I_1$ can arise in the first line 14. With the fuses 24 it is avoided that the high line current $I_1$ also flows through the second line 15 and further lines. The fuses 24 can for example be realized as shown in FIG. 8 or as positive temperature coefficient thermistors.

Figure 10A:
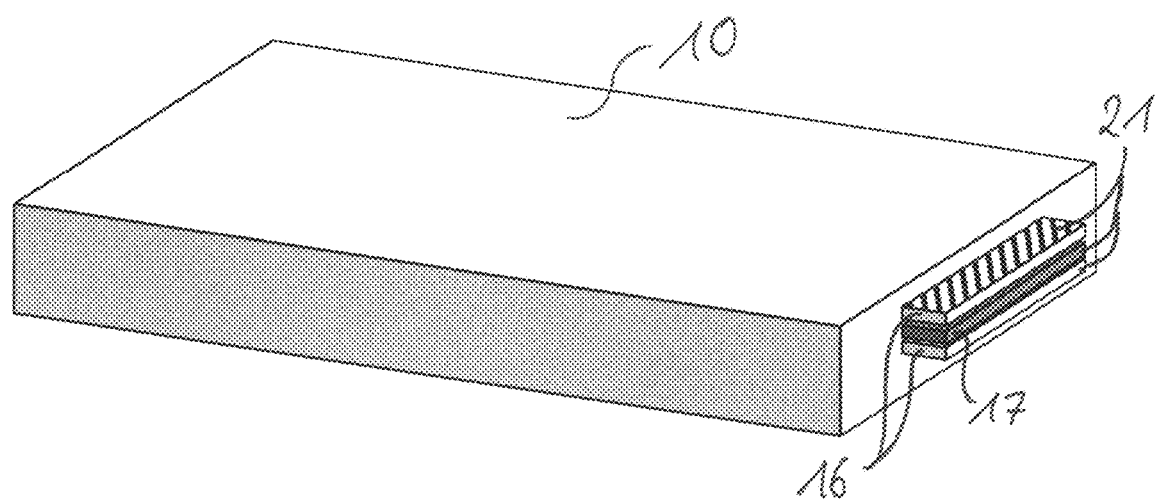

In FIG. 10A a battery 10 with a first terminal 16 and a second terminal 17 is shown. The first terminal 16 and the second terminal 17 are arranged at a side surface of the battery 10. The first terminal 16 comprises two contacts 21 which are marked hatched. The second terminal 17 comprises one contact 21 which is marked solid. The contacts 21 of the first terminal 16 and of the second terminal 17 have the same shape. The first terminal 16 and the second terminal 17 are coplanar. Advantageously, the first terminal 16 and the second terminal 17 are coplanar or coaxial in order to reduce the extent of the magnetic field induced by the current flowing through the terminals 16, 17.

Figure 10B:
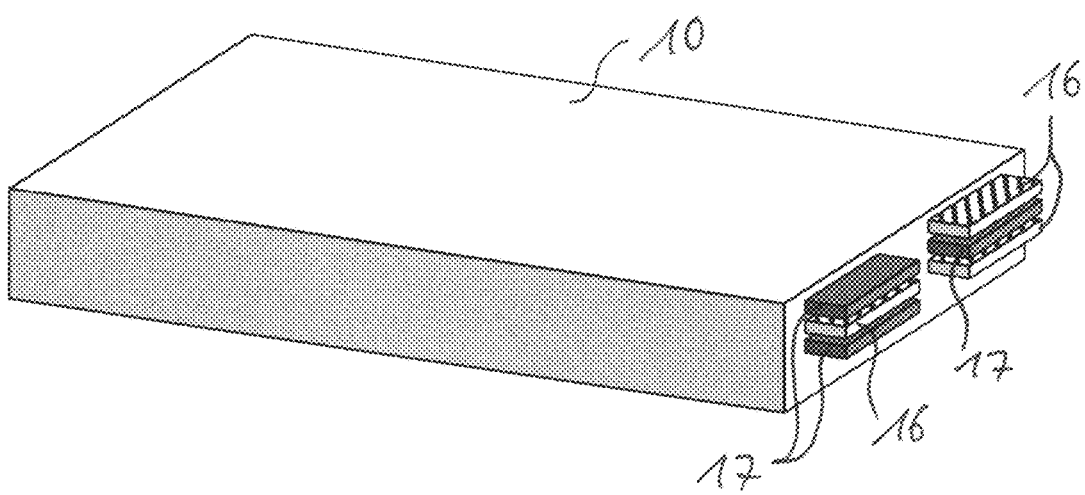

In FIG. 10B an alternative to arrange the first terminal 16 and the second terminal 17 at a side surface of the battery 10 is shown. Both terminals 16, 17 comprise three contacts 21. A contact 21 of the first terminal 16 is arranged between two contacts 21 of the second terminal 17 in a coplanar arrangement. Moreover, a contact 21 of the second terminal 17 is arranged between two contacts 21 of the first terminal 16 in a coplanar arrangement.

Figure 10C:
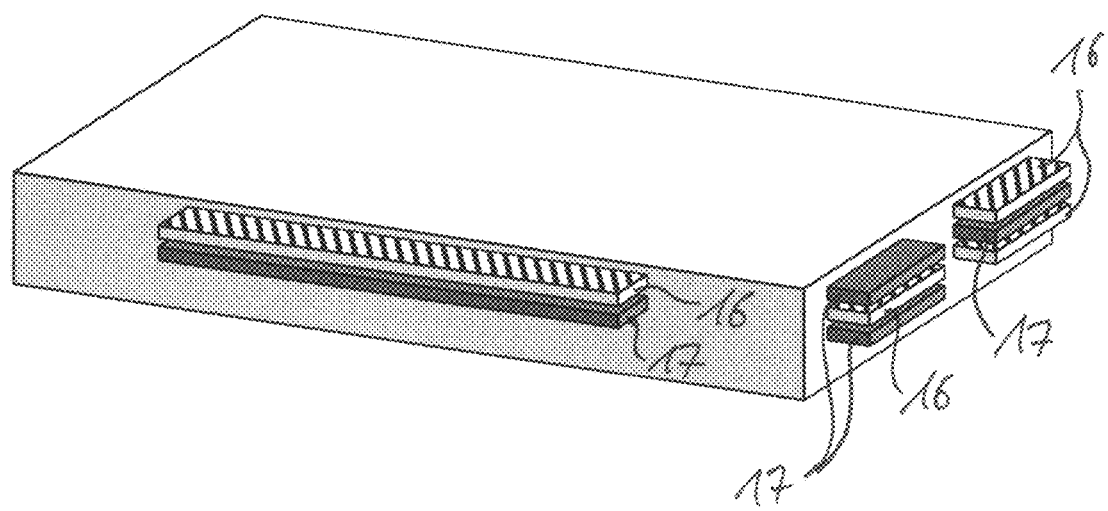

In FIG. 10C an alternative to arrange the first terminal 16 and the second terminal 17 at a side surface of the battery 10 is shown. The battery 10 comprises the same contacts 21 as shown in FIG. 10B and furthermore two contacts 21 at a further side surface of the battery 10. At the further side surface a contact 21 of the first terminal 16 and a contact 21 of the second terminal 17 are arranged next to each other in a coplanar arrangement. As the battery voltage is small, the currents at the first terminal 16 and at the second terminal 17 can be high. Therefore, it is advantageous to distribute the current over several electrical contacts 21.

In FIGS. 11A to 11I nine alternatives to arrange the first terminal 16 and the second terminal 17 at a side surface of the battery 10 are shown. The contacts 21 of the first terminal 16 are marked hatched and the contacts 21 of the second terminal 17 are marked solid. In all embodiments the terminals 16, 17 are arranged coplanar or coaxial in order to reduce the extent of the magnetic field induced by the current flowing through the terminals 16, 17.

Figure 11A:
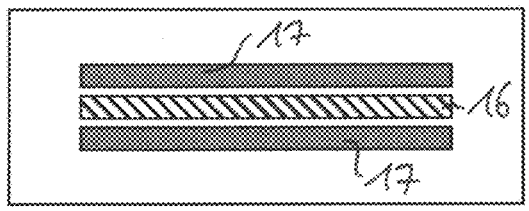

In FIG. 11A the first terminal 16 comprises one contact 21 and the second terminal 17 comprises two contacts 21. All contacts 21 are rectangular shaped and arranged coplanar. The first terminal 16 is arranged between the two contacts 21 of the second terminal 17.

Figure 11B:
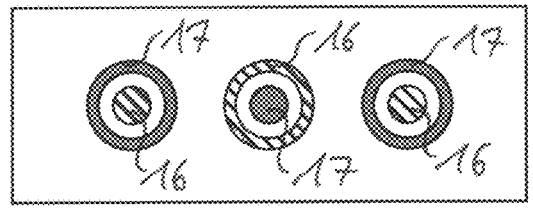

In FIG. 11B the first terminal 16 and the second terminal 17 each comprise three contacts 21. A first contact 21 of the first terminal 16 is circular shaped. The first contact 21 of the first terminal 16 is surrounded by a ring-shaped contact 21 of the second terminal 17. A second contact 21 of the second terminal 17 is circular shaped. The second contact 21 of the second terminal 17 is surrounded by a ring-shaped contact 21 of the first terminal 16. A third contact 21 of the first terminal 16 is circular shaped. The third contact 21 of the first terminal 16 is surrounded by a ring-shaped contact 21 of the second terminal 17.

Figure 11C:
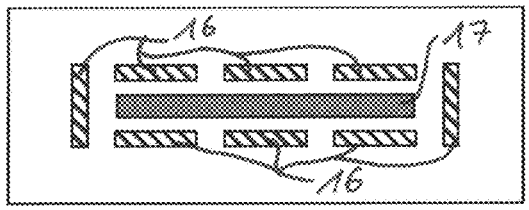

In FIG. 11C the first terminal 16 comprises eight contacts 21 and the second terminal 17 comprises one contact 21. All contacts 21 are rectangular shaped. The contacts 21 of the first terminal 16 are coaxially arranged around the second terminal 17.

Figure 11D:
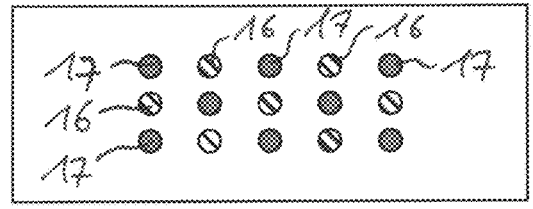

In FIG. 11D the first terminal 16 comprises seven contacts 21 and the second terminal 17 comprises eight contacts 21. All contacts 21 are circular shaped. The contacts 21 of both terminals 16, 17 are arranged in an alternating structure, this means in a checkerboard structure.

Figure 11E:
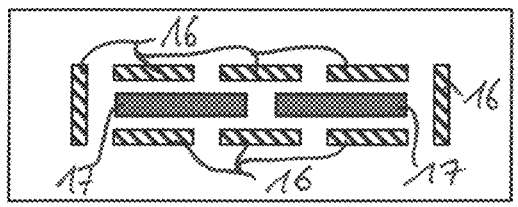

In FIG. 11E the first terminal 16 comprises eight contacts 21 and the second terminal 17 comprises two contacts 21. All contacts 21 are rectangular shaped. The contacts 21 of the first terminal 16 are coaxially arranged around the contacts 21 of the second terminal 17.

Figure 11F:
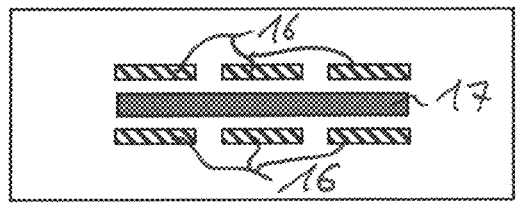

In FIG. 11F the first terminal 16 comprises six contacts 21 and the second terminal 17 comprises one contact 21. All contacts 21 are rectangular shaped. The two terminals 16, 17 are arranged coplanar and the second terminal 17 is arranged between the contacts 21 of the first terminal 16.

Figure 11G:
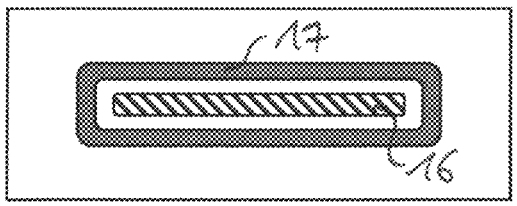

In FIG. 11G the first terminal 16 and the second terminal 17 each comprise one contact 21. The first terminal 16 is rectangular shaped. The second terminal 17 is arranged as a stripe that surrounds the first terminal 16.

Figure 11H:
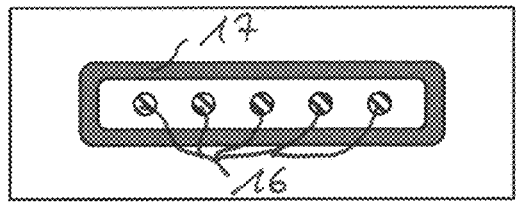

In FIG. 11H the first terminal 16 comprises five contacts 21 and the second terminal 17 comprises one contact 21. The contacts 21 of the first terminal 16 are circular shaped and are arranged along a line at the side surface of the battery 10. The second terminal 17 is arranged as a stripe that surrounds the contacts 21 of the first terminal 16.

Figure 11I:
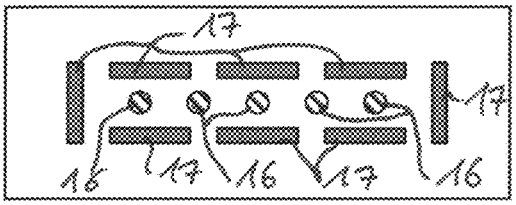

In FIG. 11I the first terminal 16 comprises five contacts 21 and the second terminal 17 comprises eight contacts 21. The contacts 21 of the first terminal 16 are circular shaped and are arranged along a line at the side surface of the battery 10. The contacts 21 of the second terminal 17 are rectangular shaped and coaxially arranged around the contacts 21 of the first terminal 16.

Figure 12A:
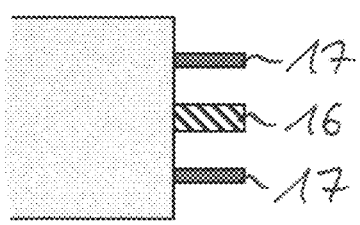

In FIG. 12A a side view of the battery 10 with the first terminal 16 and the second terminal 17 is shown. The contacts 21 of the first terminal 16 and the second terminal 17 are arranged as plugs.

Figure 12B:
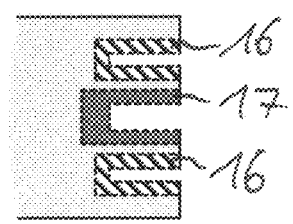

In FIG. 12B a side view of the battery 10 with the first terminal 16 and the second terminal 17 is shown. The contacts 21 of the first terminal 16 and the second terminal 17 are arranged as sockets.

Figure 13A:
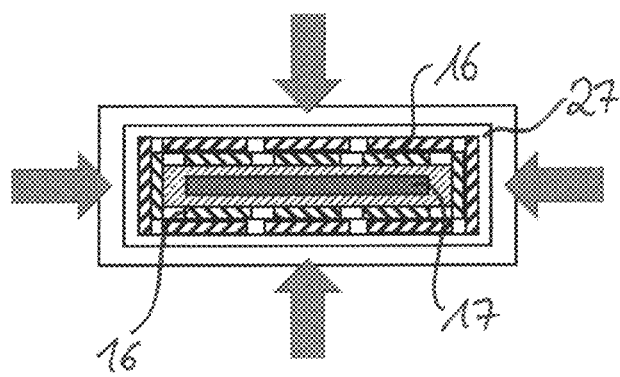

In FIG. 13A another alternative to arrange the first terminal 16 and the second terminal 17 at a side surface of the battery 10 is shown. The first terminal 16 comprises several contacts 21 and the second terminal 17 comprises one contact 21. The contacts 21 of the first terminal 16 are arranged coaxially around the contact 21 of the second terminal 17. The two terminals 16, 17 are electrically isolated against each other. A clamp 27 is arranged around the terminals 16, 17 in order to induce force on an external terminal which can be connected to the battery 10. The induced force is indicated by the arrows. In this way the contact between the two terminals 16, 17 and the external terminal is improved and the contact resistance is decreased.

Figure 13B:
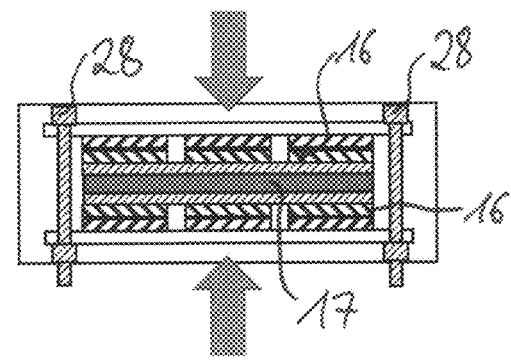

In FIG. 13B another alternative to arrange the first terminal 16 and the second terminal 17 at a side surface of the battery 10 is shown. The only difference to the embodiment shown in FIG. 13A is that the external terminal can be fixed to the terminals 16, 17 of the battery 10 by screws 28.

In FIG. 14 a circuit arrangement comprising the battery 10 is shown. The battery 10 comprises a first terminal 16 which is connected to an electric machine 30 of an electric vehicle. The battery 10 is connected to the electric machine 30 via a switch 23. The first terminal 16 is further directly connected to a power net 31 of the electric vehicle. The battery 10 further comprises a second terminal 17 which is connected to a reference potential 32. Therefore, the battery is configured to supply the electric machine 30 and the power net 31 of the electric vehicle with power. Consequently, only one battery 10 is required for the electric vehicle. As neither between the first terminal 16 and the electric machine 30 nor between the first terminal 16 and the power net 31 converters are arranged the electric machine 30 and the power net 31 are supplied with the same voltage level by the battery 10.

LIST OF REFERENCE NUMERALS

10: battery
11: battery cell
12: first group
13: second group
14: first line
15: second line
16: first terminal
17: second terminal
18: main switch
19: resistor
20: resistor switch
21: contact
22: battery module
23: switch
24: fuse
25: metal sheet
26: connection
27: clamp
28: screw
29: short circuit ring
30: electric machine
31: power net
32: reference potential
33: DC/DC converter
$I_1$: line current
$\varphi$: electrical phase

The invention claimed is:

1. Battery for an electric vehicle, the battery comprising:
a plurality of battery cells, where a first group comprises a plurality of battery cells connected to each other in parallel, a second group comprises a plurality of battery cells connected to each other in parallel, and the first group and the second group are connected with each other in series forming a first line of battery cells,
a first terminal which is configured to be connected with an electric machine and with a power net of the electric vehicle, and a second terminal which is configured to be connected with a reference potential, wherein the battery is configured to supply the electric machine and the power net of the electric vehicle with power, and the electric machine and the power net are supplied with the same voltage level by the battery.

2. Battery according to claim 1, where at least one second line of battery cells is connected in parallel with the first line, where the second line comprises the same features as the first line.

3. Battery according to claim 1, where the battery voltage which can be tapped between the first terminal and the second terminal of the battery is at most 60 V.

4. Battery according to claim 1, where the electric machine to which the first terminal is configured to be connected to is the traction motor of an electric vehicle.

5. Battery according to claim 1, where the battery is configured to be the only power supply for the electric machine.

6. Battery according to claim 2, where the first line and the second line each comprise a main switch which is arranged in series with the first group and second group, respectively.

7. Battery according to claim 6, where a resistor and a resistor switch, arranged in series, are arranged in parallel to each main switch.

8. Battery according to claim 1, where the first terminal and the second terminal of the battery are coplanar or coaxial.

9. Battery according to claim 8, where the first terminal and/or the second terminal of the battery comprise at least two contacts, respectively.

10. Battery according to claim 1, where the battery comprises at least two battery modules.

11. Battery according to claim 10, where each battery module comprises at least one first line.

12. Battery according to one of the claim 10, where at least one first line is comprised by at least two battery modules.

13. Battery according to claim 10, where the at least two battery modules are configured to be electrically coupled to the electric machine of the electric vehicle.

14. Battery according to claim 10, where the at least two battery modules are connected to each other in parallel and each battery module is assigned a respective switch to activate and/or deactivate the respective battery module.

15. Battery according to claim 10, where each first line comprises a positive temperature coefficient thermistor or a DC/DC converter, which is arranged in series with the first group and the second group, respectively.

16. Battery according to claim 2, where a fuse is connected to a circuit node of the first line and to a circuit node of the second line.

17. Battery according to claim 16, where the fuse is a positive temperature coefficient thermistor.

18. Battery according to claim 1, where the electric vehicle is at least one of:

a craft that can move on ground, a craft that can move in the air, a craft that can move on and/or in water.

* * * * *